US011925252B2

(12) United States Patent
Brandon et al.

(10) Patent No.: US 11,925,252 B2
(45) Date of Patent: Mar. 12, 2024

(54) SYSTEM AND DEVICE FOR CUSTOMIZATION OF COSMETICS

(71) Applicant: blee.llc, Collierville, TN (US)

(72) Inventors: Charles C. Brandon, Collierville, TN (US); Travis Floyd, Collierville, TN (US); Amanda D. Braught, Collierville, TN (US); Martin Wood, Collierville, TN (US); Liana Arden Pierce, Collierville, TN (US); Walter J Wallace, Collierville, TN (US)

(73) Assignee: Blee. LLC, Collierville, TN (US)

( * ) Notice: Subject to any disclaimer, the term of this patent is extended or adjusted under 35 U.S.C. 154(b) by 0 days.

(21) Appl. No.: 18/267,433

(22) PCT Filed: Jan. 4, 2023

(86) PCT No.: PCT/US2023/010134
§ 371 (c)(1),
(2) Date: Jun. 14, 2023

(87) PCT Pub. No.: WO2023/133154
PCT Pub. Date: Jul. 13, 2023

(65) Prior Publication Data

US 2024/0041186 A1 Feb. 8, 2024

Related U.S. Application Data

(60) Provisional application No. 63/296,296, filed on Jan. 4, 2022.

(51) Int. Cl.

| | |
|---|---|
| ***A45D 44/00*** | (2006.01) |
| ***B01F 33/84*** | (2022.01) |
| ***B01F 33/85*** | (2022.01) |

(52) U.S. Cl.
CPC ........ *A45D 44/005* (2013.01); *B01F 33/8442* (2022.01); *B01F 33/85* (2022.01); *A45D 2200/00* (2013.01)

(58) Field of Classification Search
CPC ... A45D 44/005; A45D 2200/00; B01F 33/85; B01F 33/8442; B01F 2101/21; B01F 33/84; B01F 33/846; B01F 35/7174; B01F 2101/30; B01F 33/848; B01F 35/20; B01F 33/844; B01F 35/71; B01F 35/714;

(Continued)

(56) References Cited

U.S. PATENT DOCUMENTS 5,163,010 A * 11/1992 Klein .................. B01F 33/8442
366/152.2
5,622,692 A * 4/1997 Rigg ....................... G01J 3/463
356/402

(Continued)

OTHER PUBLICATIONS

PCT/US23/ 10134 International Search Report dated Apr. 24, 2023.

*Primary Examiner* — Dariush Seif
(74) *Attorney, Agent, or Firm* — Veritay Group IP PLLC; Susan Fentress

(57) ABSTRACT

The presently disclosed subject matter relates to a system, device, and method for customizing a cosmetic product. The system includes: an interface device, in electronic communication with a single batch cosmetic device. A plurality of cartridges for holding cosmetic additive which can be dispensed by a mixing assembly in accurate units to create customized cosmetics.

12 Claims, 14 Drawing Sheets

(58) Field of Classification Search
CPC B01F 35/881; B01F 35/8822; B01F 35/2131; B01F 35/2207; B01F 35/715
USPC .......................................................... 53/467
See application file for complete search history.

(56) References Cited

U.S. PATENT DOCUMENTS 5,785,960 A * 7/1998 Rigg .................... A61B 5/0059 700/239
5,938,080 A * 8/1999 Haaser .................. B01F 33/848 222/144.5
6,516,245 B1 * 2/2003 Dirksing ............... B01F 33/846 700/239
6,615,881 B2 * 9/2003 Bartholomew ......... G07F 13/06 141/2
6,739,111 B2 * 5/2004 Banks ....................... B65B 3/12 141/237
7,562,680 B2 * 7/2009 Khoo .................. B01F 33/8442 222/536
8,186,872 B2 5/2012 Bartholomew et al.
8,593,634 B1 * 11/2013 Igarashi ................ B01F 33/844 356/402
8,640,432 B2 * 2/2014 Rodrigues ............ A45D 44/005 141/69
8,830,467 B2 * 9/2014 Igarashi .................. B01F 33/84 356/402
9,007,588 B1 * 4/2015 Igarashi ................. G05B 15/02 356/402
9,858,685 B2 * 1/2018 Nichol .................... G01J 3/463
10,182,635 B2 * 1/2019 Lee ........................ A45D 34/00
10,271,629 B1 * 4/2019 Nichol .................. B01F 31/441
10,366,513 B2 7/2019 Nichol et al.
10,625,226 B1 4/2020 Brandon et al.
10,843,150 B1 * 11/2020 Ong .......................... G02F 1/01
11,004,238 B2 5/2021 Nichol et al.
11,529,599 B1 * 12/2022 Springer .............. B67D 1/0037
11,590,465 B2 2/2023 Brandon et al.
11,590,468 B1 * 2/2023 Papp .................. G01N 35/1002
11,854,029 B2 * 12/2023 Orsita .................... A61Q 19/00
2001/0006486 A1 * 7/2001 Ofverberg ............. A47J 43/046 366/205
2002/0064880 A1 * 5/2002 Merten ............... B01F 35/8822 422/63
2003/0062379 A1 * 4/2003 Bartholomew ......... G07F 13/06 435/100
2006/0124196 A1 * 6/2006 Bartholomew ..... B01F 35/2207 141/100
2006/0259195 A1 * 11/2006 Eliuk .................. B01F 33/8442 700/245
2008/0047972 A1 * 2/2008 Bartholomew ....... B01F 33/844 222/144.5
2009/0184135 A1 * 7/2009 Bartholomew ....... B01F 33/846 222/144
2010/0241270 A1 * 9/2010 Eliuk ........................ A61J 1/20 700/216
2010/0251671 A1 * 10/2010 Thompson ............. B65B 63/08 53/127
2012/0152406 A1 * 6/2012 Bartholomew ........... B65B 3/04 141/104
2013/0338821 A1 * 12/2013 Igarashi .......... B01F 35/717611 700/233
2014/0081462 A1 * 3/2014 Igarashi .............. B01F 33/8442 700/265
2014/0081463 A1 * 3/2014 Igarashi .............. B01F 33/8442 700/265
2015/0021356 A1 * 1/2015 Witchell ............... B01F 33/848 222/23
2015/0231582 A1 * 8/2015 Schwartz ............ B01F 35/7174 366/142
2015/0253782 A1 * 9/2015 Igarashi .............. B01F 33/8442 700/265
2016/0206132 A1 * 7/2016 Chen ....................... A47J 43/04
2016/0310920 A1 * 10/2016 Brown .................... B01F 25/31
2016/0357196 A1 * 12/2016 Igarashi .................. B01F 31/60
2017/0151538 A1 * 6/2017 Balooch .............. B01F 35/2209
2017/0154372 A1 * 6/2017 Balooch ................ B01F 33/846
2017/0228892 A1 * 8/2017 Nichol ................ B01F 35/7174
2018/0033161 A1 * 2/2018 Nichol ............... B65D 83/0022
2018/0072557 A1 * 3/2018 Bertness ............... B01F 33/848
2018/0085721 A1 * 3/2018 Rinaldis .............. B01F 35/2207
2018/0206612 A1 * 7/2018 Bartholomew ...... A45D 44/005
2018/0215488 A1 * 8/2018 Sebastian ................ B01F 31/50
2018/0284729 A1 * 10/2018 Orsita ................. B01F 33/8442
2019/0291069 A1 * 9/2019 McIntosh ................ B01F 33/84
2019/0366285 A1 * 12/2019 Brandon .............. A45D 44/005
2019/0377368 A1 * 12/2019 Besen ................. B01F 35/7174
2020/0260840 A1 * 8/2020 Dedewo ............... A45D 44/005
2020/0277093 A1 * 9/2020 Besen ..................... B01F 29/10
2020/0315926 A1 * 10/2020 Belkhir ........... B01F 35/717613
2020/0317500 A1 * 10/2020 Belkhir ................. B01F 33/846
2021/0076807 A1 * 3/2021 Pack .................. G06Q 10/0631
2021/0267355 A1 * 9/2021 Litner ................... B01F 33/846
2021/0298442 A1 * 9/2021 Jang ...................... B01F 35/717
2021/0307480 A1 * 10/2021 Zucker .................. B01F 27/071
2021/0370250 A1 * 12/2021 Triantis ................. B01F 23/405
2021/0370251 A1 * 12/2021 Alvisi ........................ F04B 9/04
2022/0176331 A1 * 6/2022 Marchal ............... A45D 44/005
2022/0305450 A1 * 9/2022 Brandon ............. B01F 33/8442
2022/0382241 A1 * 12/2022 Kang .................... B01F 33/844
2023/0046151 A1 * 2/2023 Shin ........................ G06F 21/31

* cited by examiner

SYSTEM AND DEVICE FOR CUSTOMIZATION OF COSMETICS

CROSS REFERENCE TO RELATED APPLICATIONS

This application is a 371 application claiming the benefit of PCT/US23/10134 filed Jan. 4, 2023 and U.S. provisional patent application Ser. No. 63/296,296 filed Jan. 4, 2022 (hereby specifically incorporated herein by reference).

STATEMENT REGARDING FEDERALLY SPONSORED RESEARCH OR DEVELOPMENT

None.

REFERENCE TO SEQUENCE LISTING, A TABLE FOR A COMPUTER PROGRAM LISTING, COMPACT DISC APPENDIX

None.

BACKGROUND OF THE INVENTION

Field of the Invention

The presently disclosed subject matter relates to an improved system and a method to deliver custom cosmetics.

Description of the Related Art Including Information Disclosed Under 37 CFR 1.97 and 1.98

Currently, the majority of cosmetics products are produced in bulk quantities in a factory environment. These factories use industrial machinery dispensing cylinder to make large batches of cosmetic products; however, the complexity and cost of these machines prohibits small businesses, such as a nail salon, retailer, or individual user and individual users from creating smaller batches or single batches of cosmetic products.

In factory environments, systems to produce bulk quantities of cosmetic products store ingredients in tanks, vats, or other large containers that are difficult and time-consuming to clean. The machines that produce large batches of products include features, such as tubing, to transport or dispense formulations that require cleaning between batches, hence many machines feature cleaning cycles using strong solvents or other methods to clean the equipment between batches. Additionally, many of these systems require pressurization or air-tight components to prevent contamination or exposure to air making these machines difficult to repair. Certain machines have been developed for use in stores and these use a rotating carousel design to dispense cosmetic additives. However, as many of the cosmetic additive are air and temperature sensitive, this approach has not yielded consistent products.

The overall complexity of these machines makes scaling down the machines impractical if not impossible. A need exists in the industry to produce a simple machine for in-home, salon, store, or alternative manufacturing use while still providing a variety of high quality custom cosmetic products. To meet the individual requirements of each user, a single batch cosmetic device is needed to address the unique needs of users such as color preference, ingredient preferences, skin-tone matching products, product texture or finish, or other ingredient preferences.

Advantages of the presently disclosed subject matter will become evident to those of ordinary skill in the art after a study of the description, Figures, and non-limiting Examples in this document.

SUMMARY OF THE INVENTION

The inventive subject matter includes: a system for the formulation of a custom cosmetic product made of a plurality of stationary cartridges, each of the plurality of stationary cartridges being configured to separately contain at least one cosmetic additive required to form a custom cosmetic product; and a displacing assembly, wherein the displacing assembly is not in fluid communication with the plurality of stationary cartridges; the displacing assembly configured to physically displace the at least one cosmetic additive from each of the plurality of stationary cartridges.

In another embodiment a method of regulating the operation of a cosmetic dispensing system. This cosmetic dispensing system includes a linear positioning platform configured to transport: a displacing assembly, a mixing assembly, and a capping assembly and a dispensing management system including a microcontroller having a microprocessor, a memory, and a plurality of sensors, the method including the steps of: receiving, by the dispensing management system, an X coordinate position of the linear positioning platform from an at least one first sensor of the plurality of sensors and determining, by the dispensing management system, the X coordinate position of the positioning platform; receiving, by the dispensing management system, a Y coordinate position of the capping assembly from an at least one second sensor of the plurality of sensors; determining, by the dispensing management system, the Y coordinate position of the capping assembly and regulating by dispensing management system, the Y coordinate position of the capping assembly to remove a cartridge cap from at least one cartridge corresponding to the selected cosmetic product; regulating, by the dispensing management system, the position of the displacing assembly to dispense a portion of a cosmetic additive from at least one of a plurality of cartridges; receiving, by the dispensing management system, a Y coordinate position of the capping assembly from an at least one second sensor of the plurality of sensors; determining, by the dispensing management system, the Y coordinate position of the capping assembly and regulating by dispensing management system, the Y position of the capping assembly to attach the cartridge cap from at least one cartridge corresponding to the selected cosmetic product; regulating by the dispensing management system the transport of the mixing assembly linear positioning platform to the delivery station; and regulating by the dispensing management system, the mixing assembly, the mixing of the cosmetic additive in a bottle. Advantages of the presently disclosed subject matter will become evident to those of ordinary skill in the art after a study of the description, figures, and non-limiting examples in this document.

The inventive subject matter further includes: a system to dispense custom cosmetic products. This system is made of a computer application deployed on an interface device; a housing having a management system including a microcontroller having a microprocessor, a memory, and a plurality of sensors, wherein the management system is in electronic communication with the interface device; a linear positioning platform; a displacing assembly, a mixing assembly, a capping assembly, wherein the displacing assembly, the mixing assembly and the capping assembly are disposed on the linear positioning platform, and a plurality of stationary cartridges containing a cosmetic additive, and a delivery station configured to receive a bottle.

BRIEF DESCRIPTION OF THE DRAWINGS

The novel features of the invention are set forth with particularity in the claims. Features and advantages of the present invention are referred to in the following detailed description, and the accompanying drawings.

DESCRIPTION OF EXEMPLARY EMBODIMENTS

The present invention can be understood more readily by reference to the following detailed description of the invention. It is to be understood that this invention is not limited to the specific devices, methods, conditions, or parameters described herein and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value unless the context dictates otherwise. Ranges can be expressed herein as from "about" or "approximately" one value and/or to "about" or "approximately" another value. When such a range is expressed, another embodiment includes from the one value and/or to the other value. Similarly, when values are expressed as approximations, by use of the antecedent "about," it will be understood that the value forms another embodiment. All combinations of method or process steps as used herein can be performed in any order, unless otherwise specified or clearly implied to the contrary by the context in which the referenced combination is made.

These and other aspects, features and advantages of the invention will be understood with reference to the detailed description herein and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs.

The present invention provides a system, device, and method that allows a user to make selections (i.e., product selection and cosmetic additive or color selection) on an interface device that are communicated to a single batch cosmetic device to precisely formulate, mix, and dispense a plurality of custom cosmetic products.

Figure 1:
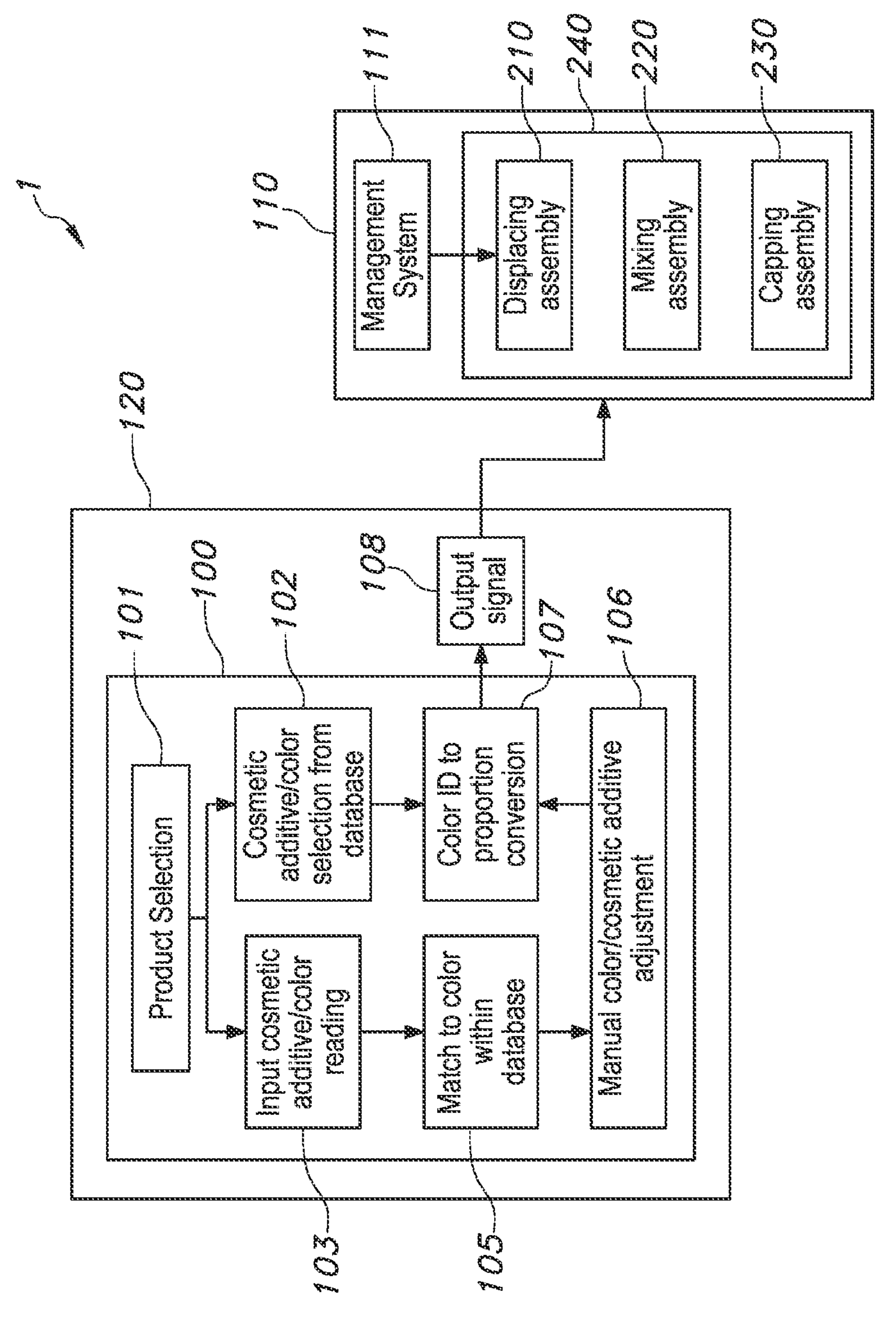
FIG. 1 is a general overview of the system for customization of cosmetics.

FIG. 1 illustrates a system 1 for the automated delivery of customized cosmetics as a single batch. The system 1 has components: a computer application 100 deployed on an interface device 120 for product selection 101 and cosmetic additive or color selection 102, a single batch cosmetic device 110, and a plurality of stationary cartridges. A single batch cosmetic device 110 processes a single batch of the desired cosmetic. Single-batch cosmetics refer to individual units of a cosmetic product customized by a user. The user selects a cosmetic application in the product selection 101 and cosmetic additive or color selection 102 via the interface device 120 with the computer application 100. The interface device 120 can be either remote or integrated into the single batch cosmetic device 110. In one embodiment, the interface device 120 includes a processor with a memory capable of running a computer application 120 for a user to make product and color or cosmetic additive selections. The interface device 120 also includes a display device through which the user makes selections. This could be a touch screen if the interface device 120 is a smartphone, laptop, PDA, tablet, or a small interface device and screen located on the single batch cosmetic device.

The single batch cosmetic device 110 includes a management system 111, such as a circuit board. The management system 111 can include either a microprocessor or a microcontroller. A microprocessor includes any of a type of miniature electronic device that contains the arithmetic, logic, and control circuitry necessary to perform the functions of a digital computer's central processing unit. A microcontroller is a small computer on a single metal-oxide-semiconductor (MOS) integrated circuit (IC) chip. A microcontroller contains one or more CPUs (processor cores) along with memory and programmable input/output peripherals. The management system 111 can receive commands from the interface device 120 to formulate the selected cosmetic product. The management system 111 can receive information from cartridge circuit boards (not shown) such as fill level, or which cosmetic additive is filled within the cartridge (not shown). The management system 111 can relay information to the computer application 100. The single batch cosmetic device 110 can include a power cable for powering the device.

The cosmetic additive or color can be selected in two ways. First, the user can select a cosmetic additive or color from a database 102 of colors or a customization-suite to assist with color selection. Second, the user can match a cosmetic additive or color, read from an input 103 such as from a picture or saved image. The user can match a color from an inputted image to a color within the database 105. The step of color matching involves providing the computer application 100 with an image to extract color information, wherein the extraction step involves picking a color from the image or live camera interface and identifying the color proportion value. Once a color is finalized, the representative proportion value of the color is identified 107 and electronically communicated 108 to the single batch cosmetic device 110. In one example, the user can perform manual color/cosmetic additive adjustment 106 to select a desired color/cosmetic additive. The single batch cosmetic device 110 can customize color cosmetics including but not limited to: liquid makeups (such as concealer or foundation), liquid lip products (such as lip gloss or liquid lipstick), skincare products (such as serums or lotions), liquid eye products (such as mascara or eyeshadow) and nail polishes of a specified shade or composition.

The single batch cosmetic device 110 includes a positioning assembly 240 which includes a transportation platform for the displacing assembly 210, the mixing assembly 220, and a capping assembly 230. The function of the positioning assembly 240 is to laterally move the displacing assembly 210, mixing assembly 220, capping assembly 230 to a desired position along the positioning assembly track.

Figure 2:
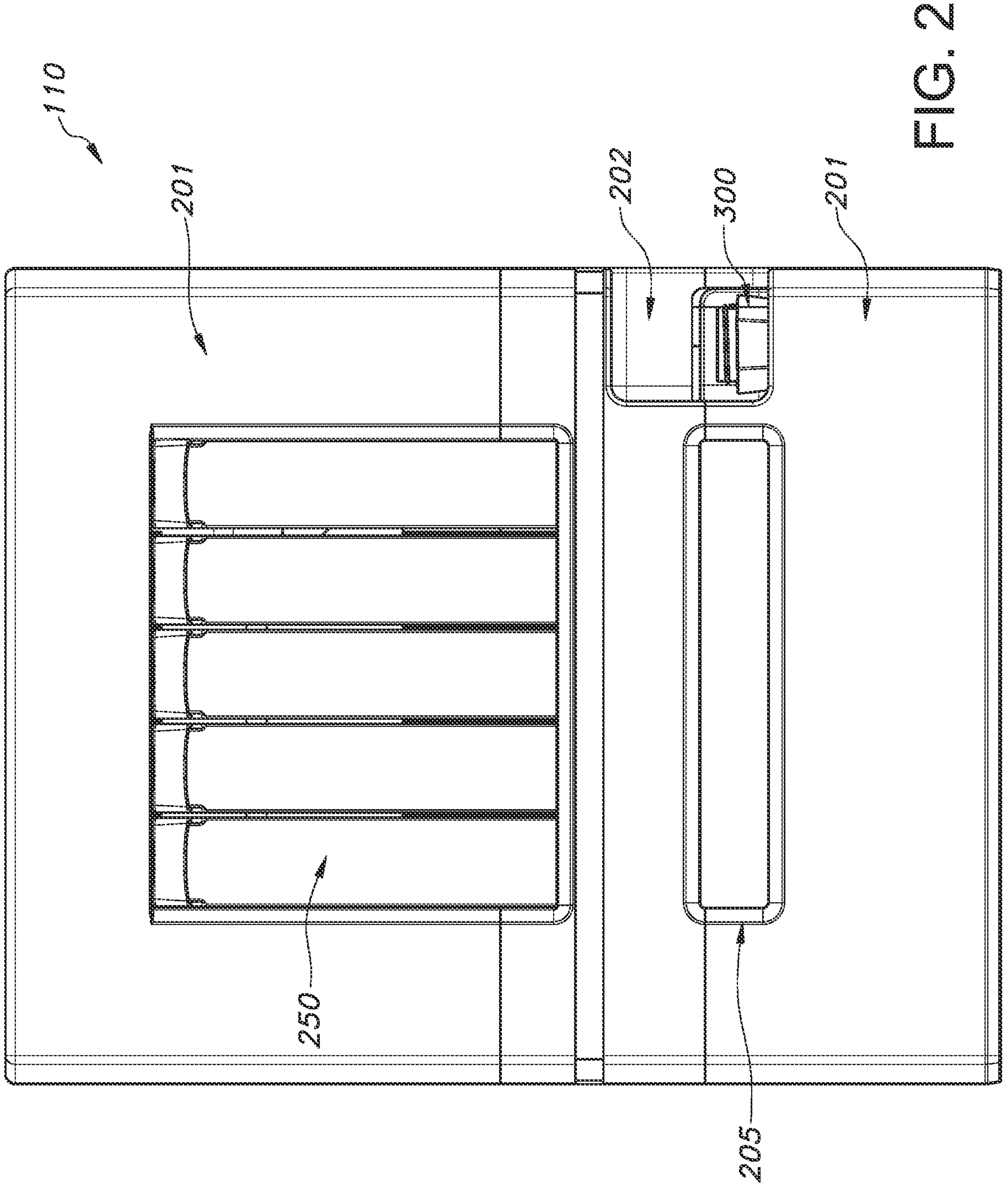
FIG. 2 is a front view of the single batch cosmetic device

Now referring to FIG. 2 a front view of the single batch cosmetic device 110 is shown. A housing 201 is configured to enclose the mechanical and electrical components of the of the single batch cosmetic device 110. An open port (not shown) in the housing 201 is configured to receive a plurality of stationary cartridges 250. The plurality of stationary cartridges 250 are fixedly retained by a slot (not shown) in the housing 201 during operation of the single batch cosmetic device 110. A delivery station 202 such as an entry port is positioned in the housing 201 to receive a bottle 300. A viewing window 205 is positioned to view the process. Each of the plurality of stationary cartridges 250 holds cosmetic additive such as specific liquid pigment, powdered cosmetic additives, or other liquid that is dispensed in accurate amounts. The cosmetic additive can be, for example, a pigment; formulation-adjusting additives such as thinners, product feel or texture altering agents; product differentiators such as glitter, shimmer, mattifying agents, holographic materials; or active ingredients for skincare such as SPF agents, acne treatment, blemish treatment, or hydrating treatments. A each of the plurality of stationary cartridges 250 can be deposable or refillable once the cosmetic additive is dispensed.

Figure 3A:
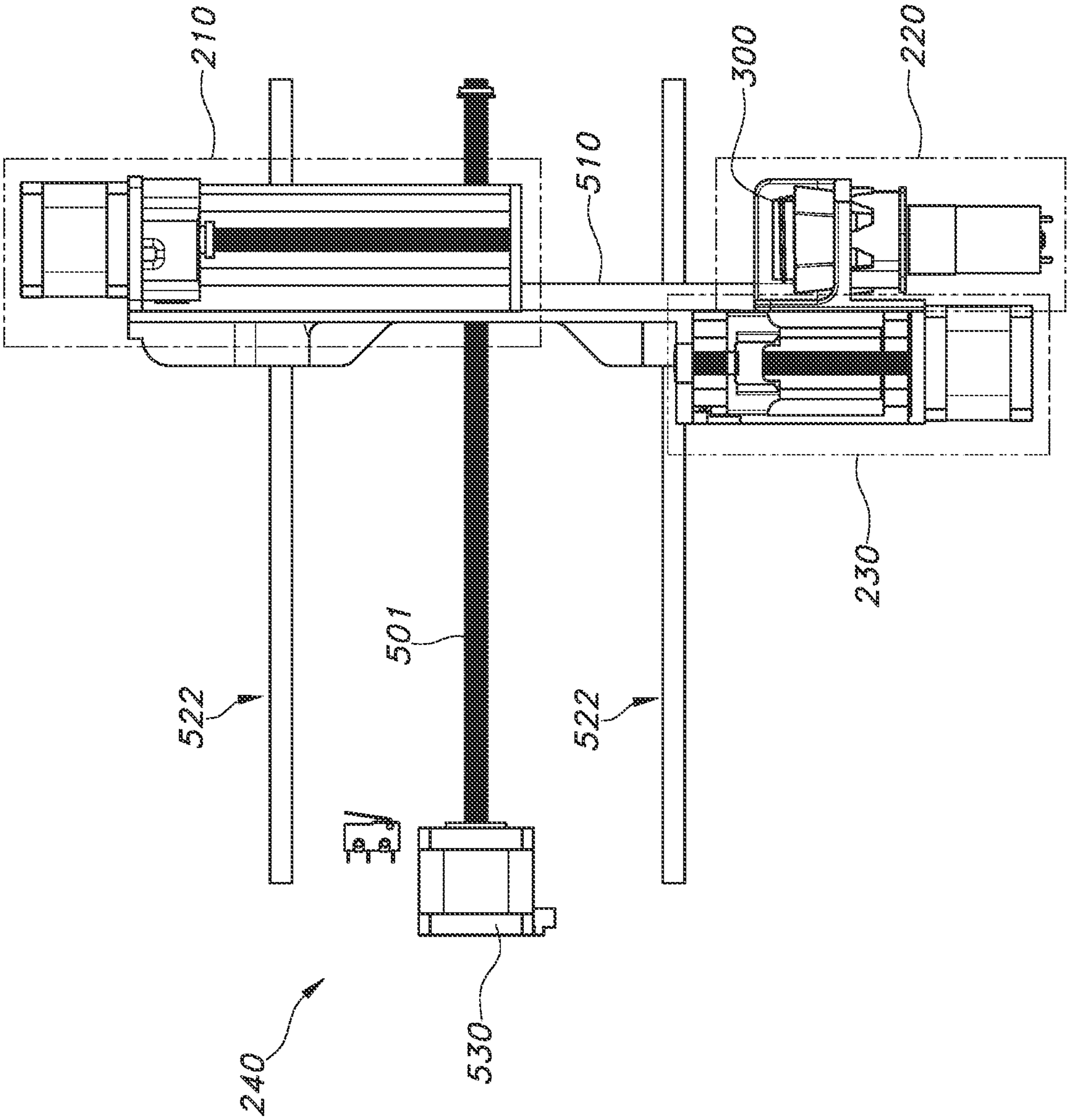
FIG. 3A is an overview view of the mechanical systems of the single batch cosmetic device.

Now referring to FIG. 3A, an embodiment of the interior of a single batch cosmetic device 110 for providing the selected cosmetic of the system of FIG. 1, is shown. The single batch cosmetic device 110 includes a positioning assembly 240 which includes a linear positioning platform 510 which is a transportation platform for the: displacing assembly 210, the mixing assembly 220, and a capping assembly 230. The function of the positioning assembly 240 is to laterally move the displacing assembly 210, mixing assembly 220, capping assembly 230 as a movable unit to a desired position along the linear positioning assembly track 501. The positioning assembly 240 is configured to move the linear positioning platform 510 to a position along the linear positioning assembly track 501. The positioning assembly track 501, in one embodiment is a threaded rod. As part of the displacement of cosmetic additives, to make the desired cometic product, the linear positioning platform 510 moves laterally along track 501 to position the bottle 300 in the desired position to receive cosmetic additives, The linear positioning platform 510 is unitary structure made of an injection molded plastic or a 3D printed plastic. In an exemplary embodiment, the horizonal movement of the positioning platform 510 is facilitated by linear positioning assembly track 501 such as a threaded rod which is operably connected to the linear positioning assembly motor 530.

Now referring to FIGS. 1, 3B, and 7A-7B, the horizontal and vertical movement within the single batch cosmetic device 110 is controlled by the management system 111, such as a circuit board. Upon receiving at least one product selection, the management system 111, controls the movement of the linear positioning platform 510 of the positioning assembly 240. The linear positioning platform 510 is configured to move laterally along track 501. Lateral movement of the positioning platform 510 is from the start position 305 which is opposite the first sensor 301. When a bottle is placed in the mixing assembly 220, the linear positioning platform 510 is at the start position 305. Two support rods 522 are provided.

The linear positioning platform 510 moves laterally to the first sensor 301 to determine its X coordinate position and then the management system 111 is able to locate the exact position of the desired cartridge of the plurality of stationary cartridges 250. The capping assembly 230 moves to its first travel position 308 at the second sensor 311 to verify its vertical position (Y-position) and returns to its resting position 309. The dispensing assembly 210 moves to its first position at the third sensor 321 to verify its vertical travel position 307 and it returns to its resting position 306. The management system 111 determines the appropriate cartridge of the plurality of stationary cartridges 250 as well as the lateral displacement necessary for the linear positioning platform 510 to reach the appropriate cartridge of the plurality of stationary cartridges 250 needed to obtain the desired cosmetic. Additionally the management system 111 determines the vertical displacement needed for the capping assembly 230 to uncap the stationary cartridge 250.

The process of dispensing involves the steps of uncapping, dispensing. mixing and recapping. These steps are achieved by the lateral and vertical movement of the single batch cosmetic device 110. Upon receiving a bottle into the mixing assembly 220, the system 1 performs the steps of: receiving, by the management system 111, an X coordinate position of the linear positioning platform 510 from an at least one first sensor 301 of the plurality of sensors and determining, by the dispensing management system 111, the X coordinate position of the linear positioning platform 510. The lateral positioning platform 510 moves to a position adjacent to the selected cartridge with reference to the position established by the sensors.

The system 1 performs the steps of receiving, by the management system 111, a Y coordinate position of the capping assembly 230 from an at least one second sensor 311 of the plurality of sensors. The capping arm 231 of the capping assembly 230 moves from the resting position 309 to a determined level wherein the tongue 518 of the capping arm 231 is at substantially the same height as the groove 261 of the cartridge cap 253. This is the travel position 308.

The system 1 performs the steps of regulating by dispensing management system, the Y position of the capping assembly to remove a cap from at least one cartridge corresponding to the selected cosmetic product. The lateral positioning platform 510 laterally slots the tongue 518 of the capping arm 231 into a grooved portion 261 of a cartridge 250. The capping arm 231 then moves vertically to the resting position 309, thereby displacing the cartridge cap 253 from the stationary cartridge 250. The selected cartridge can now dispense the cosmetic additive directly to the bottle 300 positioned below the selected cartridge to form the cosmetic product. The system 1 performs the steps of regulating, by the dispensing management system, the position of the displacing assembly to dispense a portion of a cosmetic additive from at least one of a plurality of cartridges Next the linear positioning platform 510 moves to the determined lateral position of the selected cartridge of the plurality of stationary cartridges 250. In this position, the cosmetic additive will flow into the bottle 300 disposed below the selected cartridge of the plurality of stationary cartridges 250. The displacing assembly 210 moves the determined vertical displacement distance. This distance is determined by management system 111 such as a circuit board. Then displacing assembly 210 moves to the second sensor 311 to determine its vertical position. It then moves to its resting position 307 for the displacing assembly 210. The mixing assembly 220 briefly spins to disperse the cosmetic additive including the pigment.

The next step in the process is recapping. The system performs the steps of receiving, by the management system 111, a Y coordinate position of the capping assembly from an at least one second sensor of the plurality of sensors; determining, by the dispensing management system 111, the Y coordinate position of the capping assembly and regulating by dispensing management system 111, the Y position of the capping assembly to attach a cap from at least one cartridge corresponding to the selected cosmetic product.

The lateral positioning platform 510 moves to a position adjacent to the selected stationary cartridge 250. The capping arm 231 of the capping assembly 230 moves from the resting position 309 to a determined level wherein the tongue 518 of the capping arm 231 is at substantially the same height as the groove 261 of the cartridge cap 253. This is the travel position 308. The lateral positioning platform 510 laterally slots the tongue 518 of the capping arm 231 into replace the grooved portion 261 of the cartridge 261. The lateral positioning platform 510 moves away from a position adjacent to the selected stationary cartridge 250. The capping arm 231 moves from travel position 308 to the rest position 309, thereby enabling the positioning platform 510 to move freely in the lateral direction to another cartridge position.

The final step in the process is final mixing. The system 1 performs the steps of regulating by the management system 111 the transport of the mixing assembly linear positioning platform to the delivery station and regulating by the management system 111, the mixing assembly, the mixing of the cosmetic additive in a bottle. The positioning platform 510 moves to starting position and the product can be mixed prior to the user removing the bottle from the delivery station.

FIGS. 1 and 4A-D shows an embodiment of a cartridge of the plurality of stationary cartridges 250 that can be inserted into of a single batch cosmetic device 110. The stationary cartridge 250 has a cartridge housing 251 having a top 252, bottom 265, front 263 and back 264. The cartridge housing 251 contains at least one cylindrical or boxlike hollow chambers 256. The cartridge housing 251 also contains at least one dispensing cylinder 254 which are disposed above each chamber 256. The dispensing cylinder 254 are configured to displace cosmetic additive from the at least one chamber 256 and in the exemplary embodiment are shown as elongated elements that fit into the chambers 256 and displace the cosmetic additive from the chambers 256. The cartridge 250 is made of a cartridge body 251 which has a plurality of chambers 256 for holding cosmetic additives. The cartridge body 251 includes a cartridge top 252, with a plurality of openings 239.

In the embodiment shown, the stationary cartridge 250 has a first cylinder 256 with a larger volume ranging from about 10 to 30 ml and a second smaller cylinder 257 having a volume ranging from about 1 to 5 ml. The first cylinder 256 can dispense between about 0.09 to 1.5 ml of liquid and the second smaller cylinder 257 can dispense between about 0.03 to 0.6 ml of liquid. The liquid is dispensed from the plurality of cartridges 250, when the cartridge cap 253 is removed and the force of the displacement lever 212 displaces a predetermined volume of liquid.

A cartridge cap 253 such as a cap is shown attached to a stationary cartridge 250. The cartridge cap 253 is reversibly connected to the cartridge body 251 by a mechanical seal. The cartridge cap 253 includes a top portion 258 reversibly connected to cartridge by a gasket. A back wall 259 extending to a lower portion 238 forms a slot 237 within the cartridge cap 253. The cartridge cap 253 has a top portion 258 with a plurality of indents shaped to fit dispensing spigots 255 of the stationary cartridge 250. The cartridge cap top portion 258 fits snuggly on the dispensing spigots 255 and is displaced from the stationary cartridge 250 when the cartridge cap 253 is removed. The cartridge cap 253, if attached to the cartridge 250, blocks dispensing from the dispensing spigots 255. The dispensing spigots 255 help ensure accurate dispensing of cosmetic additives. The cartridge cap 253 is included to keep cosmetic additive fresh, or unexposed to air, within the cartridge 250. The cartridge cap 253 may also functions as a freshness barrier. The cartridge cap 253 in one embodiment is generally rectangular shaped with a “U” shaped groove portion 261 positioned near the end of the cartridge cap 253. The “U” shaped groove portion 261 is positioned to open to the front 263 of the cartridge housing 251.

Figure 4A:
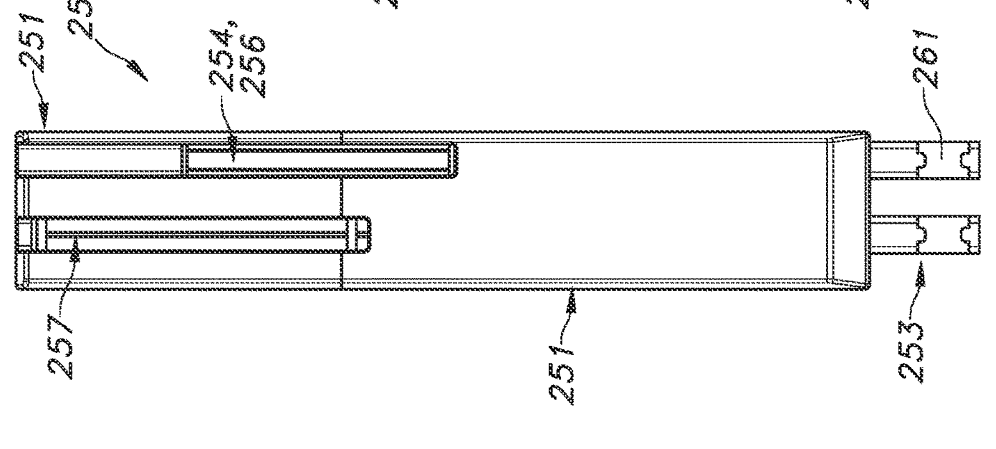
FIG. 4A illustrates a cross sectional view of an exemplary embodiment of a cartridge of the plurality of stationary cartridges.
Figure 4B:
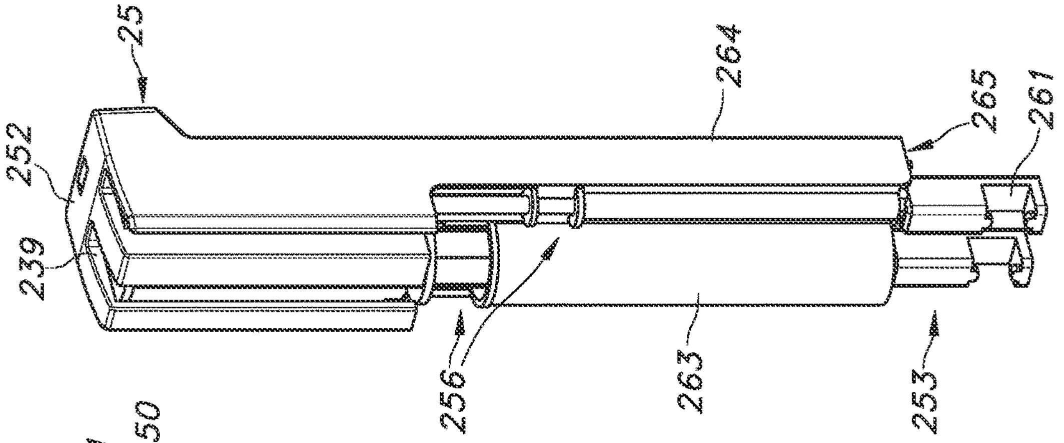
FIG. 4B illustrates a cross sectional view of an exemplary embodiment of a cartridge of the plurality of stationary cartridges.
Figure 4C:
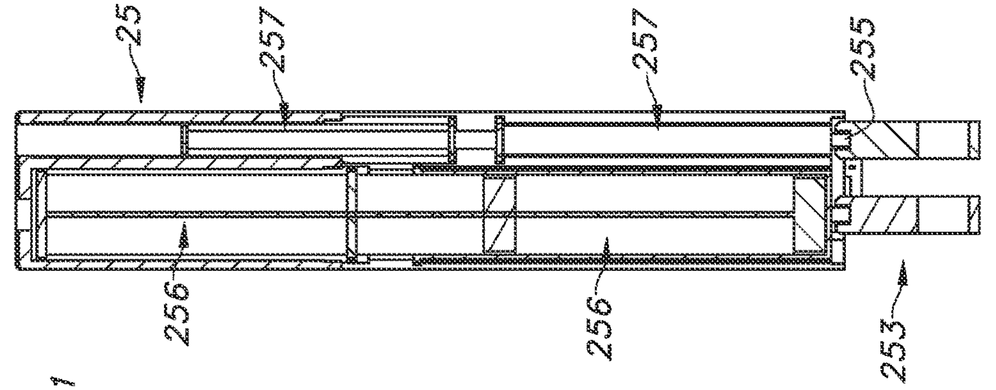
FIG. 4C illustrates a front view of an exemplary embodiment of a cartridge of the plurality of stationary cartridges.
Figure 4D:
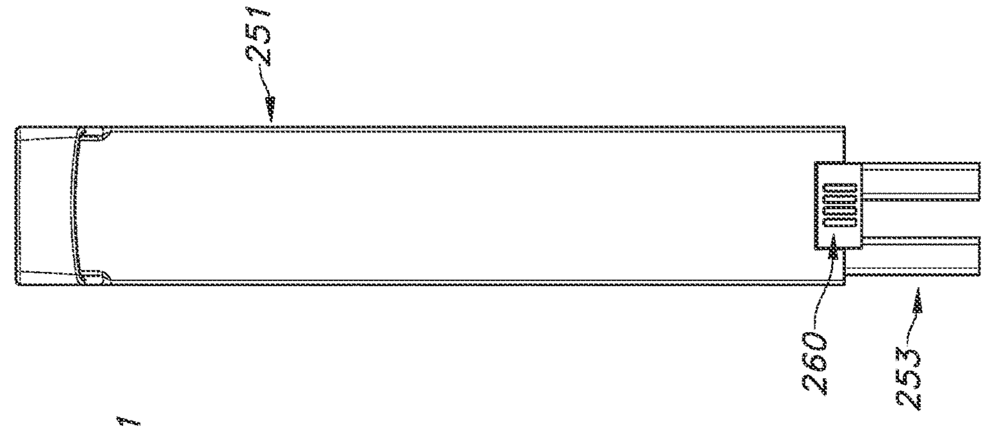
FIG. 4D illustrates a rear view of an exemplary embodiment of a cartridge of the plurality of stationary cartridges.
Figure 5:
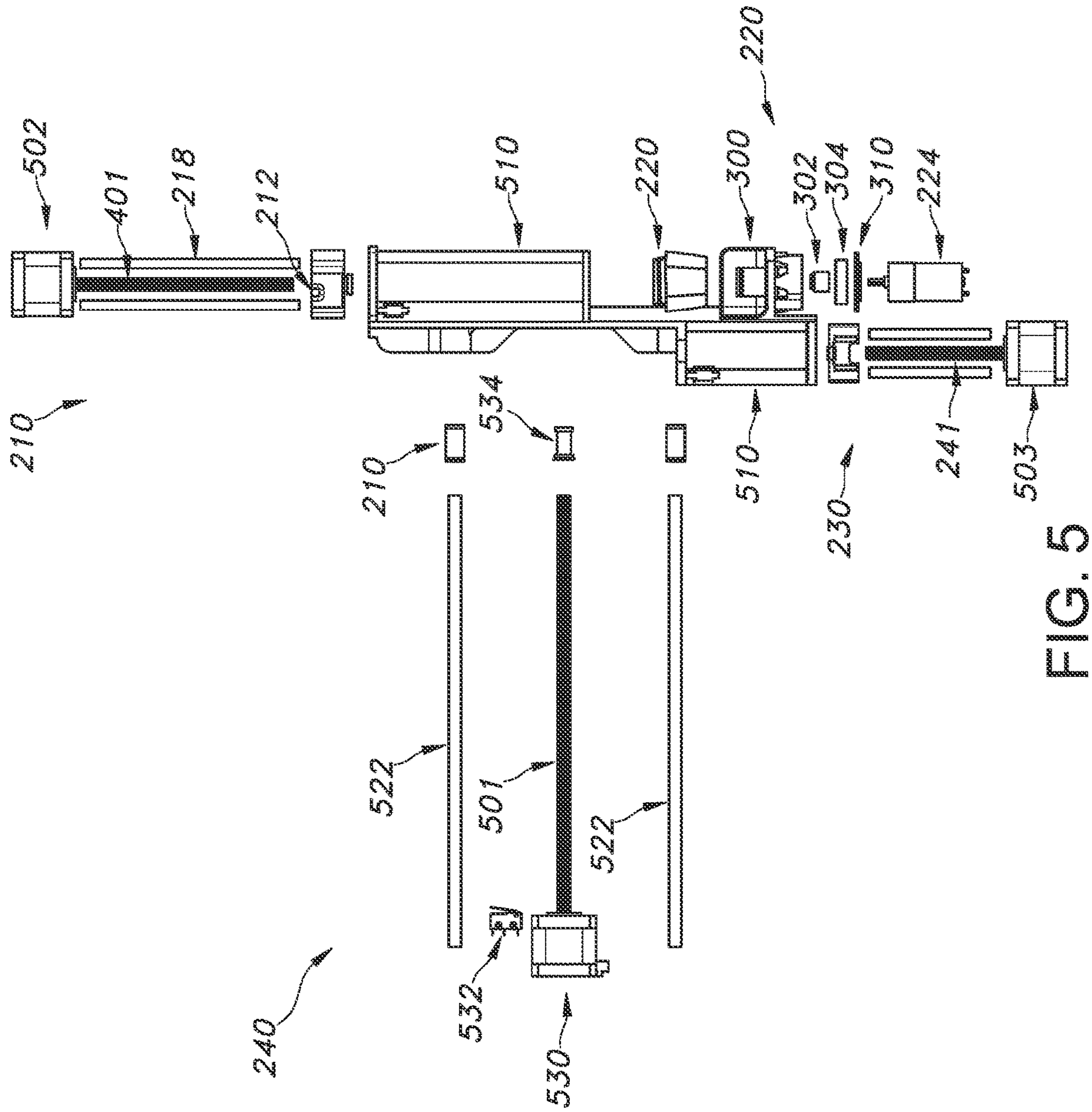
FIG. 5 is a linear positioning assembly exploded.

FIG. 4D shows a view of the back of an embodiment of a stationary cartridge 250 for a single batch cosmetic device 110 showing a cartridge circuit board 260. The cartridge circuit board 260 can store, receive, or relay information relating to cartridge contents or fill level to the circuit board 111 of the single batch cosmetic device 110. Cartridge values can be communicated and express via the remote interface to inform customers of usage rates and the quantity of remaining product. Users load cartridges, filled with cosmetic additives, to the single batch cosmetic device 110 to create products with the desired inputs Now referring to FIG. 5, a positioning assembly 240 is shown. The function of the positioning assembly 240 is to laterally move the displacing assembly 210, mixing assembly 220, and capping assembly 230 as a movable unit to a desired position along the linear positioning assembly track 501. The positioning assembly 240 moves the linear positioning platform 510 to a position along the linear positioning assembly track 501. The linear positioning assembly track 501, in one embodiment is a threaded rod. As part of the displacement of cosmetic additives, to make the desired cometic product, the linear positioning platform 510 moves laterally along track 501 to position the bottle 300 in the desired position to receive cosmetic additives, The positioning platform 510 is unitary structure made of an injection molded plastic or a 3D printed plastic. The linear positioning platform 510 is connected to the linear positioning assembly track 501 by a connector 534. such as an anti-back lash nut. The linear positioning platform 510 includes a plurality of flat surfaces that are configured to mount the mechanical assemblies such as the displacing assembly 210, mixing assembly 220, capping assembly 230, The mechanical assemblies are fixedly attached to the positioning platform 510 by connectors such as screws. The displacing assembly 210 is attached to the linear positioning platform 510 through connector such as a threaded rod 401 that is operably connect to the displacement motor 502. The capping assembly 230 is attached to the linear positioning platform 510 through retaining means such as a threaded rod 241 that is operably connect to the capping assembly motor 503. In this embodiment, the mixing assembly 220 is integral with the linear positioning platform 510. In an alternative embodiment, mixing assembly 220 the attached to the bottom surface of the linear positioning platform 510. The linear positioning platform 510 is configured to laterally move the displacing assembly 210, mixing assembly 220, capping assembly 230 to a desired position. In an exemplary embodiment, the horizontal movement of the linear positioning platform 510 is facilitated by track 501 such as a treaded rod which is operably connected to the linear positioning assembly motor 530. The positioning sensor 301 in one embodiment is switch that is provides a signal when the linear positioning platform 510 reaches a set location the CPU records position zero.

Figure 3B:
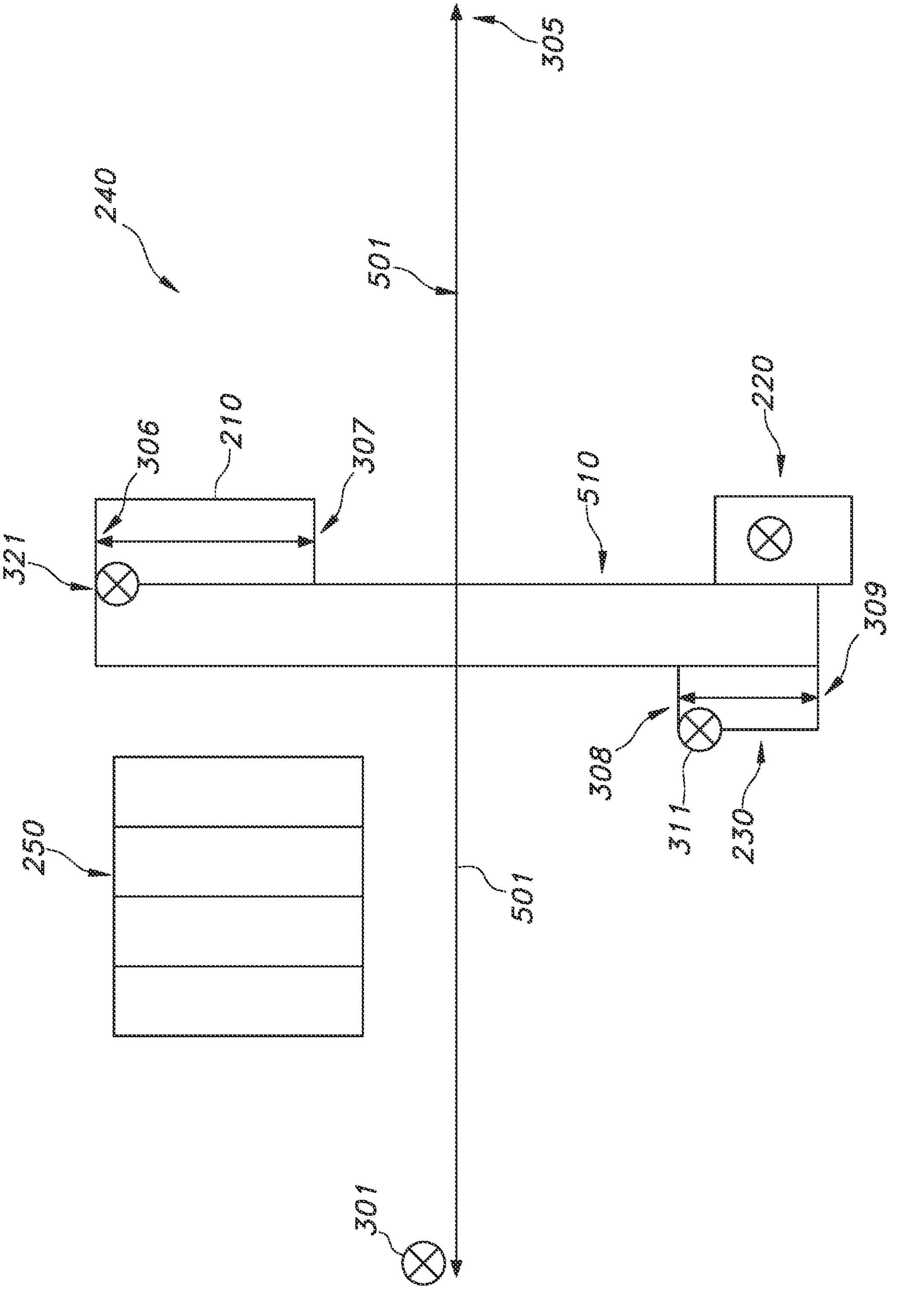
FIG. 3B is an overview view of the control system of the single batch cosmetic device.
Figure 6B:
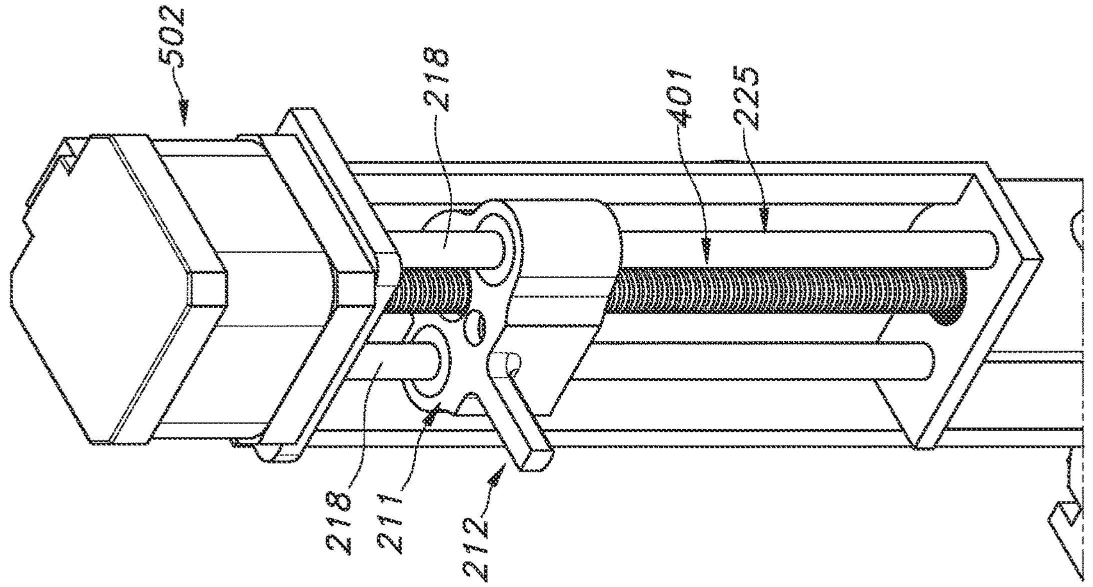
FIG. 6B shows the displacing assembly.
Figure 6A:
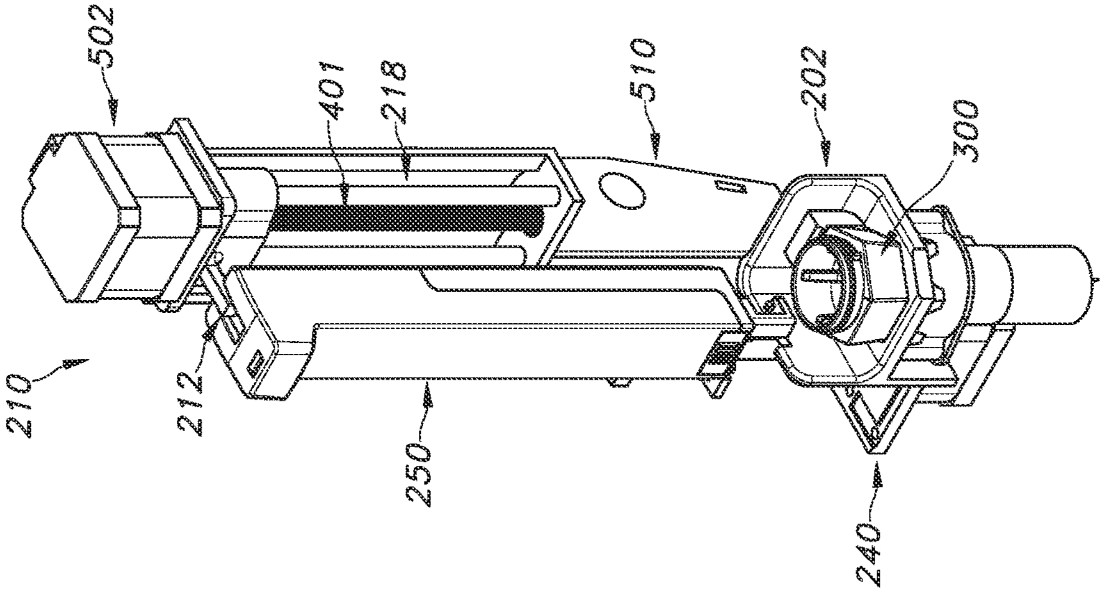
FIG. 6A shows the displacing assembly.

Now referring to FIGS. 3B and 6A-6B, the displacing assembly 210 is shown. The function of the displacing assembly 210 is to physically displace a precise volume of liquid from at least one of the plurality of stationary cartridges 250 to the bottle 300 positioned below the selected cartridge of the plurality of stationary cartridges 250. The displacing assembly 210 is positioned above the mixing assembly 220 on the positioning platform 510. The displacing assembly 220 moves laterally along the along positioning assembly track 501 to position the bottle 300 in the desired position to receive cosmetic additives from at least one of the plurality of stationary cartridges 250. Additionally, the displacing assembly 210 can move vertically along the displacement track 401. In one embodiment, the displacing assembly 210 includes a displacement lever 212 configured to press on a dispensing cylinder of one of the plurality of stationary cartridges 250. The displacement lever 212 is operably connected to the displacement track 401. The displacement track 401, in an exemplary embodiment is made of a threaded rod. The displacement assembly 210 can include its own actuator parts. Actuator parts can include a number of parts including a threaded rod with or without bearings, a position sensor 321 for registering the height of the displacement lever 212.

A displacement motor 502 is provided for spinning the displacement track 401 enabling the displacement lever 212 to move in a vertical direction. The displacement level 212 is configured to be disposed within first chamber 256 with a larger volume ranging from about 15 to 25 ml and a second smaller chamber 257 (FIG. 4C) of one of the plurality of stationary cartridges 250 to dispense a precise amount of fluid. Support rods 218 are positioned to stabilize the movement of the displacement lever 212 along the displacement track 401. A displacement lever 212 is operably connected to the displacement track 401 by a displacement lever body 211 configured with holes to receive the support rods 218 and displacement track 401.

Figure 7A:
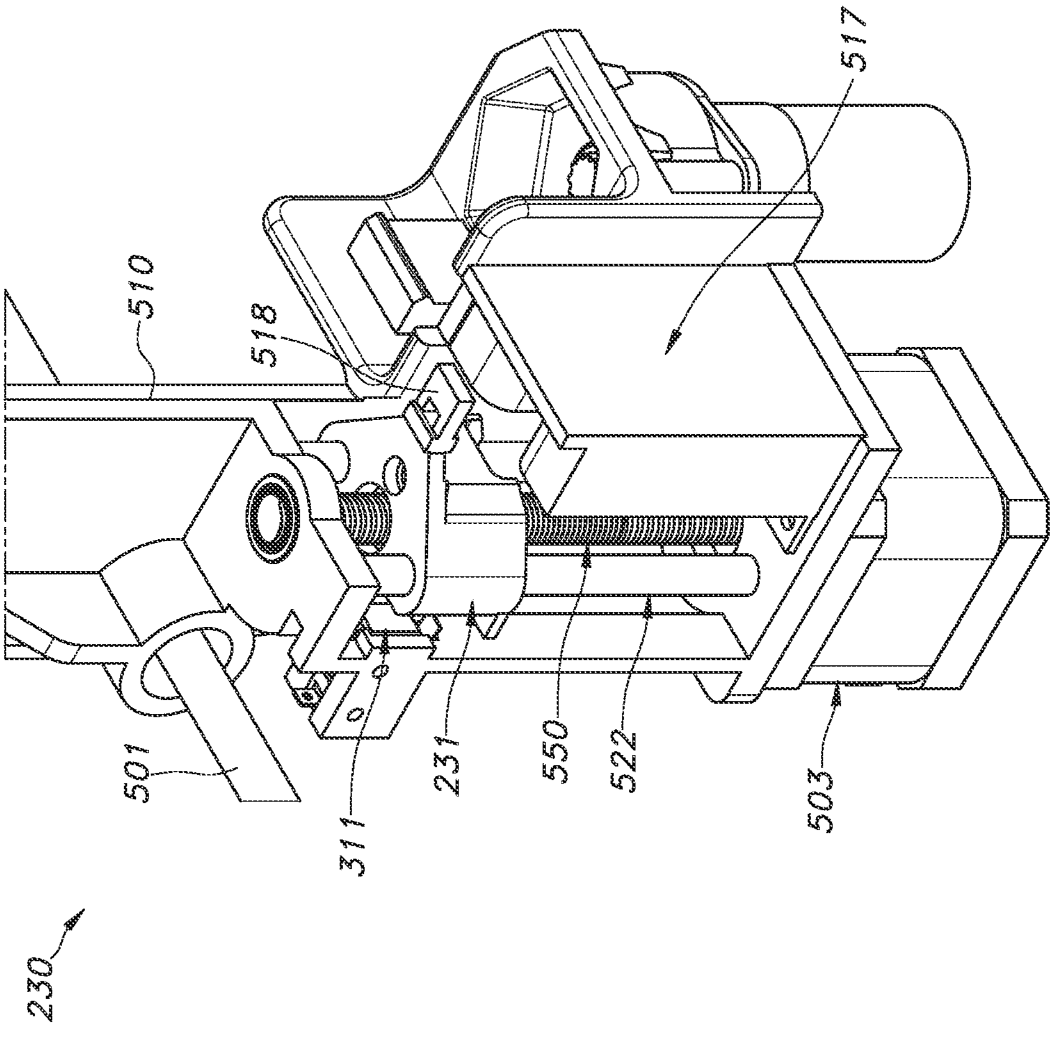
FIG. 7A shows capping assembly with reference to linear positioning platform.

Now referring to FIGS. 7A-D, a capping assembly 230 is shown. The function of the capping assembly 230 is to reversibly detach a cartridge cap 253 from one of the plurality of stationary cartridges 250 and thereby prevent contamination, increase consistency of cosmetic product, and prevent contamination by air exposure. FIG. 7A shows the inside of the exemplary embodiment of a single batch cosmetic device 110 showing the capping arm 231 of the capping assembly 230. A cartridge cap 253 is reversibly affixed to each stationary cartridge 250 to prevent the evaporation and/or contamination of the liquid cosmetic additive stored in each of the plurality of stationary cartridges 250. The capping assembly 230 is driven by a capping assembly motor 503, which is operably connected to a capping assembly track 550 and supported by support rods 552. A position sensor 311 is used to calibrate the capping assembly 230 as shown in FIG. 3B. The cap guide 517 is a wall used to secure the cartridge cap 253 when it is displaced from one of the of the plurality of stationary cartridges 250. The capping arm 231 is moved vertically by the rotation of the track 550. The two support rods 522 are cylindrical rods that support the weight of the capping assembly motor 503 while still allowing the capping arm 231 to travel along vertically along the capping track 550. The capping arm 231 includes a tongue portion 518. Tongue portion 518 is a rigid structural element that extends from the capping arm 231 and is configured to reversibly engage with a groove portion 261 of the cartridge cap 253 affixed to one of the plurality of stationary cartridges 250 as shown in FIG. 4B. The tongue portion 518 engages with a grooved portion 261 of the cartridge cap 253 and the vertical motion of the capping arm 231 removes the cartridge cap 253 from one of the plurality of stationary cartridges 250. This allows the liquid cosmetic additives to flow into the bottle disposed below.

Figure 7B:
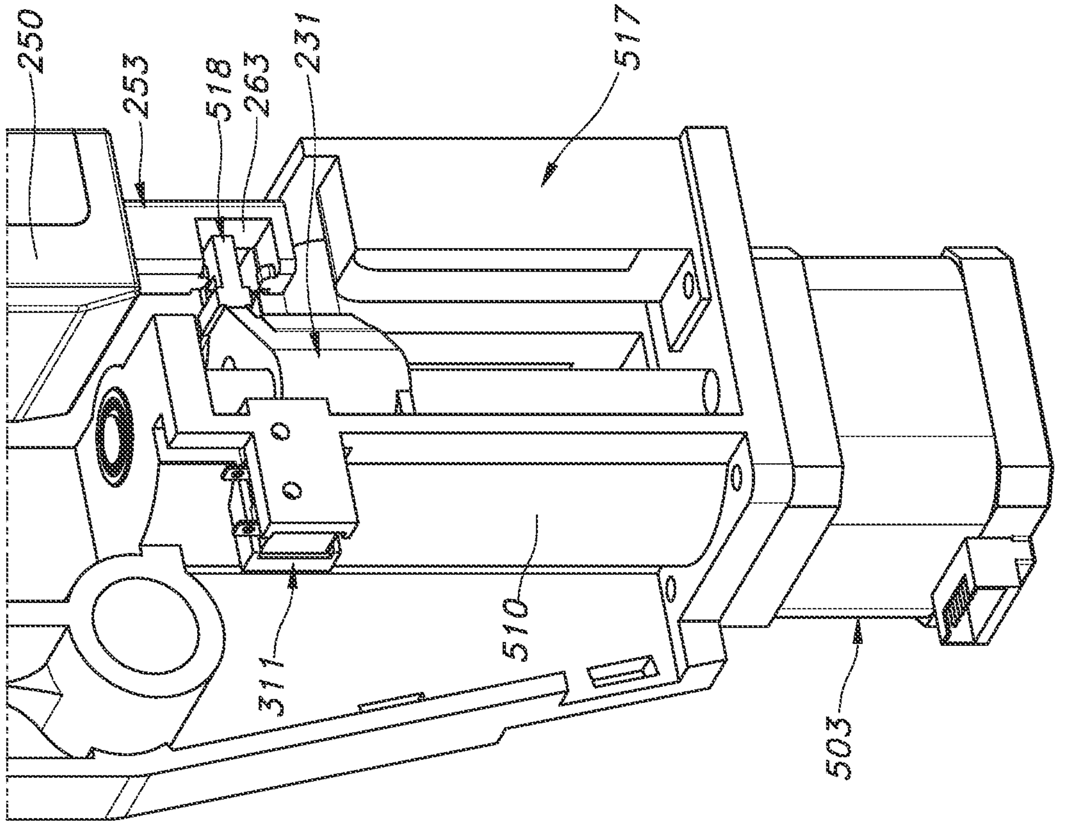
FIG. 7B shows an asymmetric view of the caping assembly.
Figure 7C:
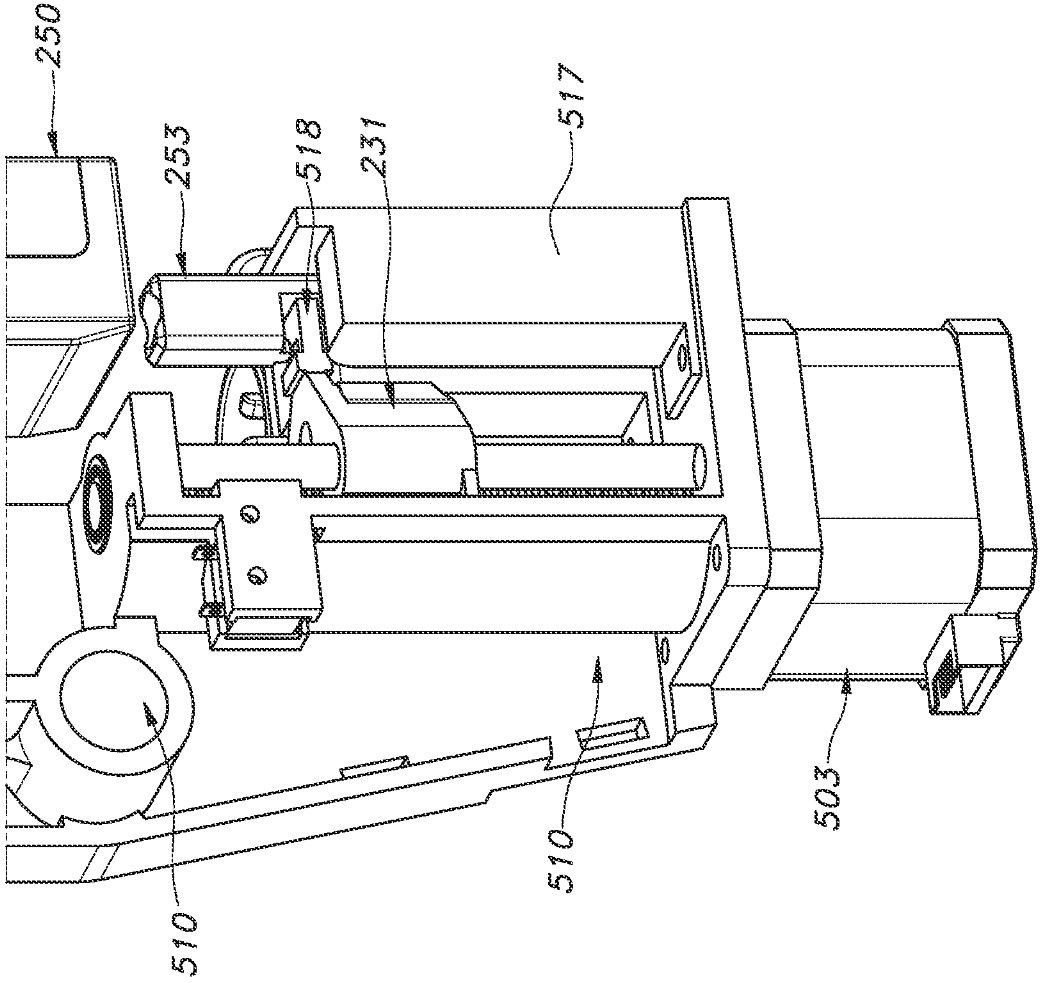
FIG. 7C shows the cap progressing into the cap guide.

Now referring to FIG. 7B-C the capping assembly 230 has three positions: travel, storage, and capped. First, the positioning platform 510 moves laterally to an appropriate position to remove a cartridge cap 253 from one of the plurality of stationary cartridges 250. The process of uncapping of cartridge cap 253 from one of the plurality of cartridges 250 occurs when the positioning assembly 240 moves laterally to the position of the selected one of the plurality of stationary cartridges 250. One of the plurality of stationary cartridge 250 is shown with the cartridge cap 253 extending below the cartridge forming a 'U" shaped groove this is configured to receive tongue portion 518 of the caping arm 231. Once the cartridge cap 253 is secured, then capping motor 503, causes capping track 550 to move the capping arm 231 vertical downwardly to remove the cartridge cap 253 from one of the of the plurality of cartridges 250. At this point, the positioning assembly 240 moves laterally so that the displacing assembly 210 can dispense a volume of the cosmetic additive from the cartridge 250 to the bottle 300. The capping arm 531 has moved vertically down the capping track 402. Dispensing spigots 255 of the stationary cartridge 250 are shown. The capping assembly 230, after the dispensing cosmetic additive, can return by the dispensing assembly track to reengage the cartridge cap 253 with the stationary cartridge 250. The capping assembly 230 engages with the cartridge cap 253 to remove the cartridge cap 253 from the stationary cartridge 250 to allow the displacement lever 212 of the displacing assembly 210 to dispense the cosmetic additive to the bottle 300.

Once the cosmetic additive is dispensed then the positioning assembly 240 returns to the prior position to reinsert the cartridge cap 253 into a stationary cartridge 250 to prevent the contamination of the liquid cosmetic additive. The cartridge cap 253 is removed from cartridge 250 for between 30-60 seconds.

Figure 7D:
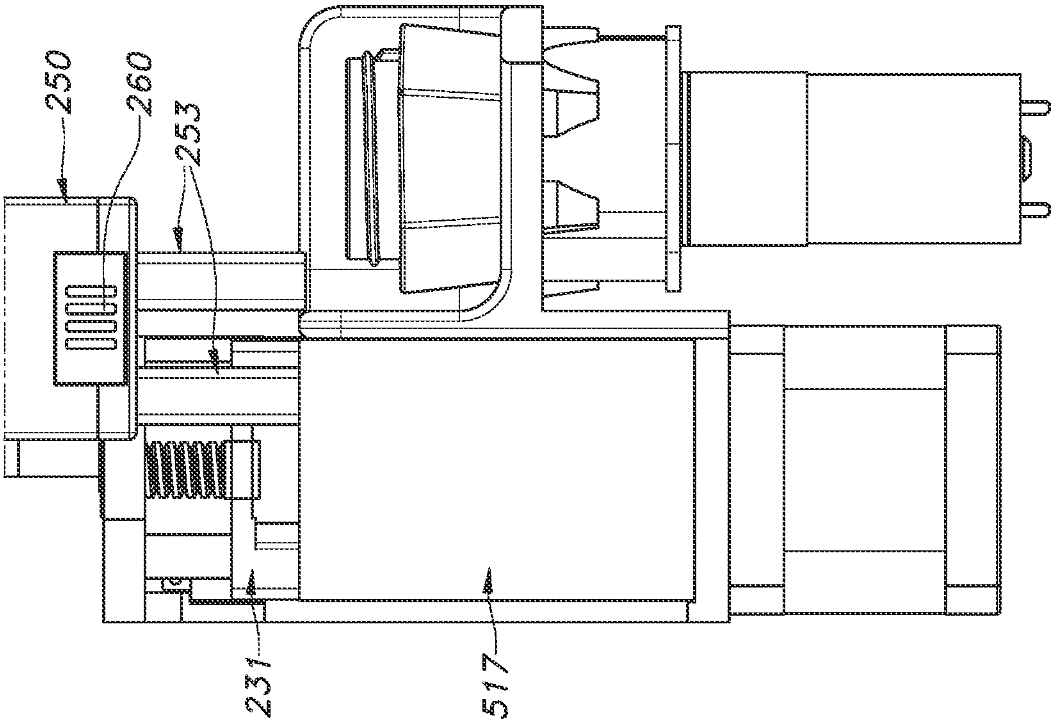
FIG. 7D show the step of cap positioning.

Now referring to FIG. 7D. The capping assembly 230 can include its own actuator parts. Actuator parts can include several parts including the threaded rod 550 with or without bearings, position sensor. This view also shows the cartridge circuit board 260. The function of the capping assembly 230 is to reversibly remove a cartridge cap 253 from a cartridge and thereby prevent contamination, increase consistency of cosmetic product, and prevent contamination of air of the liquid cosmetic additives in the cartridges.

Figure 8A:
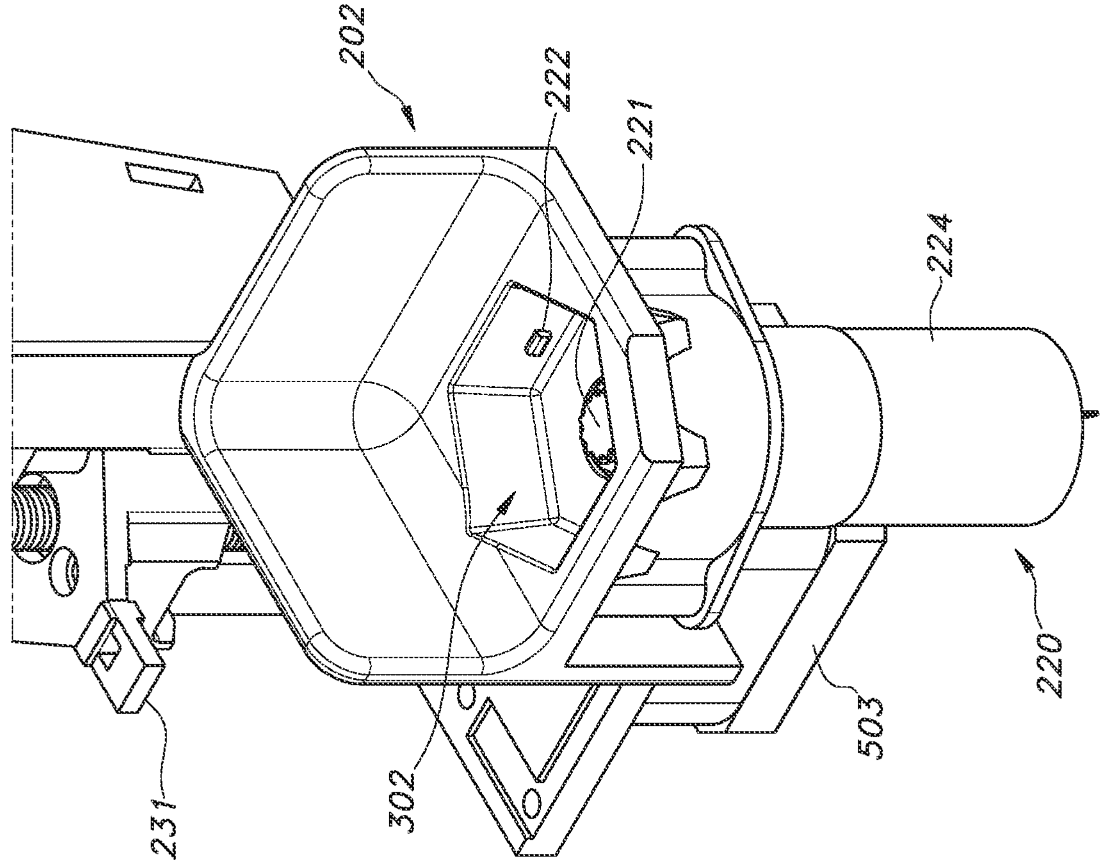
FIG. 8A is a view of the mixing assembly.
Figure 8B:
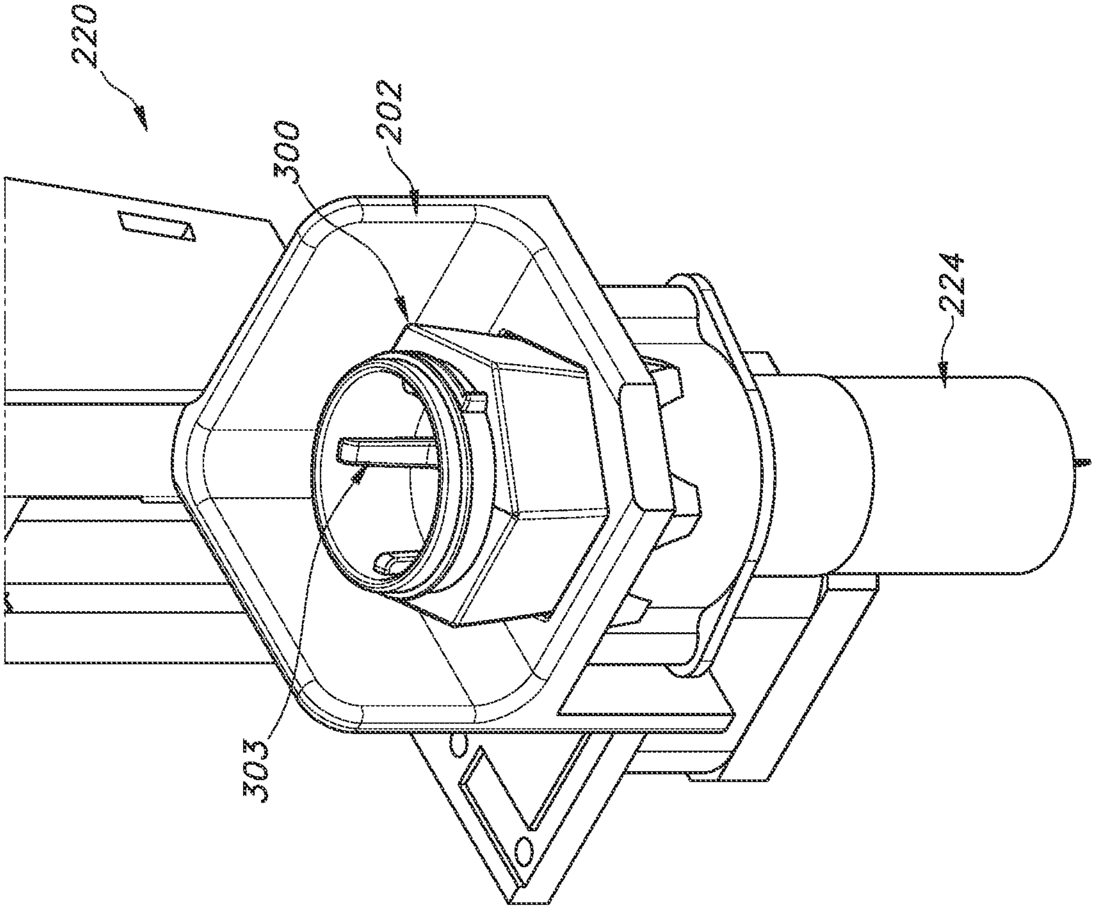
FIG. 8B is a view of the mixing assembly.

Now referring to FIGS. 2, 8A and 8B, the mixing assembly 220 is connected to the positioning assembly 240 by the linear positioning platform 510. A bottle 300 is placed in the delivery station 202 for processing. The bottle 300 contains a sufficient amount of the liquid base material to form the desired cosmetic upon receiving the cosmetic additive from a cartridge. The bottle 300 is secure in the bottle coupler 302 which is configured to receive the bottle 300. In this embodiment, the bottle 300 is hexagonal, and the bottle coupler 221 is shaped to receive and retain a hexagonal object. The positioning assembly 240 moves mixing assembly 220 i.e. bottle 300 to a desired position to receive the cosmetic additives from the plurality of stationary cartridges 250 and then returns it to the delivery station 202 for the user to remove the blended custom cosmetic such as nail polish, foundation, or lip gloss. Positioned below the bottle port 302 is the mixing bearing 304, mixing motor mount 310 and mixing motor 224. The mixing motor 224 is positioned to drive an impeller 303 integrally located within the bottle 300. The impeller 303 uniformly blends the custom cosmetic such as nail polish, foundation, or lip gloss. The mixing assembly 220 as attached to the via positioning assembly 240. The linear positioning platform 510 of the positioning assembly 240 moves mixing assembly 220 i.e. bottle 300 to a desired position to receive the cosmetic additives from the plurality of stationary cartridges 250 and then returns it to the delivery station 202 for the user to remove the blended custom cosmetic such as nail polish, foundation, or lip gloss.

Figure 9:
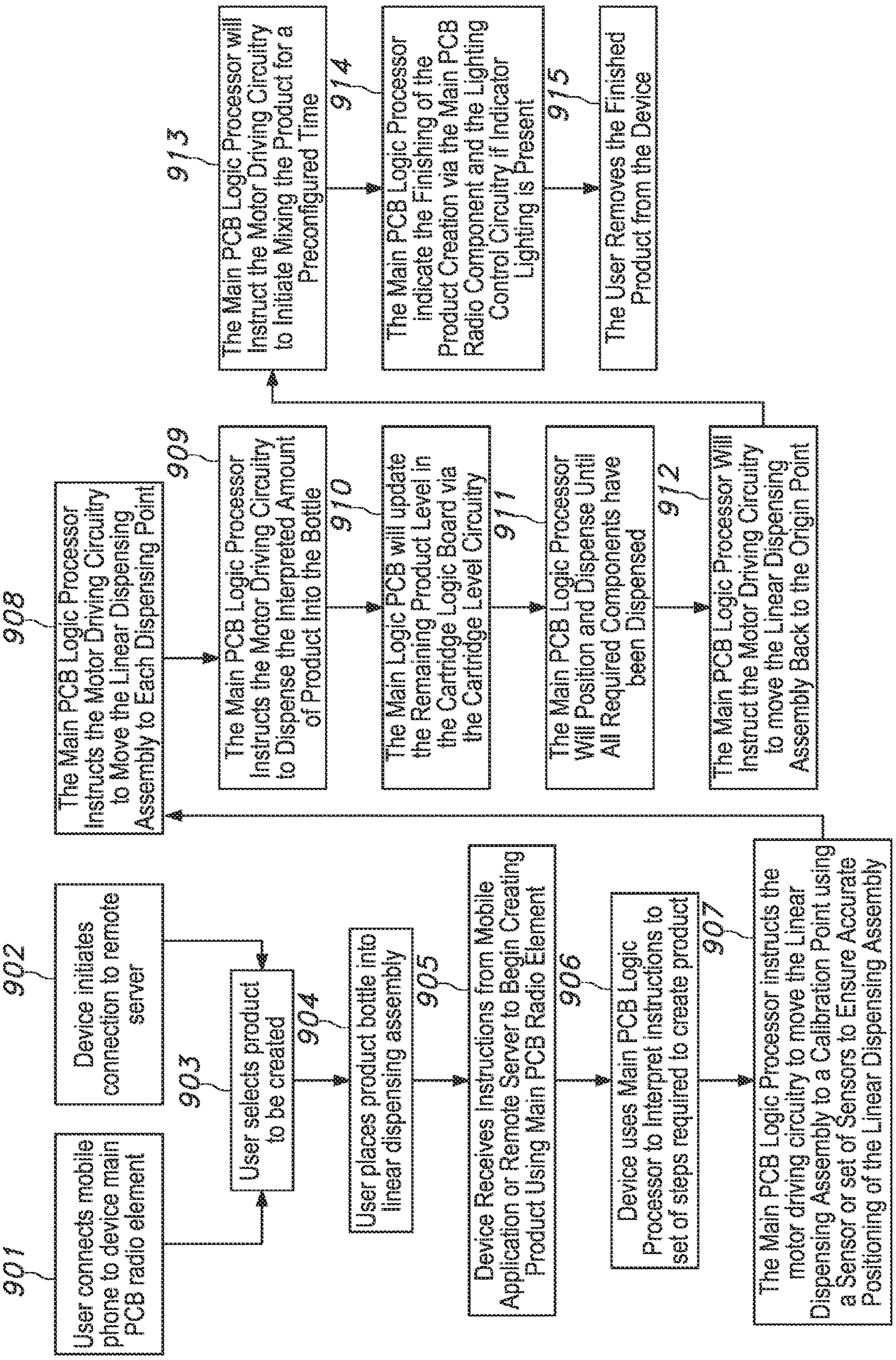
FIG. 9 is a flow chart of present inventive process.

Now referring to FIG. 9, a flowchart illustrates the operations of a processor. In the first step, a user connects mobile phone to device main pcb radio element 901. The single batch cosmetic device 110 includes a PCB radio element which is connectable with a user's mobile phone. In the second step, there may be a step where the device initiates connection to remote server 902. Third, a user selects product to be created 903. A user may send a product selection by an application to the single batch cosmetic device's computer component. Fourth, a user places product bottle into the positioning assembly 904. Fifth, the device receives instructions from mobile application or remote server to begin creating product using main PCB radio element 905. The device may on receiving the product creation information to the PCB radio element begin activating the management system for production creation. Sixth, the device uses main PCB logic processor to interpret instructions to set of steps required to create product 906. The processor of the management system interprets the production creation information to operational instructions. Seventh, the main PCB logic processor instructs the motor driving circuitry of the positioning assembly to move the linear positioning platform to a calibration point using a sensor or set of sensors to ensure accurate positioning 907.

In the eighth step of the flowchart of FIG. 9, the main PCB logic processor instructs the motor driving circuitry to move the linear positioning platform to each dispensing point 908. The processor moves the linear positioning platform to dispensing points based on the instructions generated from the product creation information. Ninth, the main PCB logic processor instructs the motor driving circuitry to dispense the interpreted amount of product into the bottle 909. Tenth, the main logic PCB will update the remaining product level in the cartridge logic board via the cartridge level circuitry 910. Eleventh, the main PCB logic processor will position and dispense until all required components have been dispensed 911. The processor or processor in communication with the remote server contains all instructions for completing dispensing of material into the bottle 300 for production creation. This may include steps such as pausing dispensing until an empty stationary cartridge 250 is replaced and continuing the dispensing instructions upon stationary cartridge 250 replacement. When the processor has carried out all instructions for dispensing the material the twelfth step begins. Twelfth, the main PCB logic processor will instruct the motor driving circuitry to move the linear dispensing assembly back to the origin point 912. Thirteenth, the main PCB logic processor will instruct the motor driving circuitry to initiate mixing the product for a preconfigured time 913. Fourteenth, the main PCB logic processor indicate the finishing of the product creation via the main PCB radio component and the lighting control circuitry if indicator lighting is present 914. In the fifteenth step, the user removes the finished product from the device 915.

A base product for liquid lip products can include emollients, waxes, colorants (pigment), thickening agents, and other additives such as fragrance or flavoring agents. Control agents can also be added to combat microbial growth. In one exemplary embodiment, the container for lip liquid lip products includes Hydrogenated Polyisobutene, Ethylene/Propylene/Styrene Copolymer, Butylene/Ethylene/Styrene Copolymer; Titanium Dioxide; a plurality of waxes: beeswax, carnauba, sumac wax, candelilla wax, ozokerite; a plurality of oils: lanolin, polybutene, almond, coconut, avocado, jojoba, castor oil, linseed oil, sesame oil, shea butter, silicone-based oils, a combination thereof, or other suitable fluid liquid lip products. A base product can be either a translucent product, a white-based product to have color added, the white pigment of the single batch device to provide the proper proportions of white in a certain shade (with the base product being a translucent mixture), or any of the previous three mixtures with additional cosmetic additive added. When the base product contains additional cosmetic additive added, a user can be adjusting the color of a prior custom cosmetic product. A base product for nail polish can include polymers dissolved into a volatile, organic solvent, nitrocellulose dissolved in butyl acetate or ethyl acetate. Common ingredients also include plasticizers (prevent brittleness), dyes and pigments, opalescent (enhance coloration), adhesive polymers (ensure nitrocellulose adheres to surface of nail), thickening agents (prevent premature settling of pigments), and ultraviolet stabilizers (resist color change when exposed to sunlight) a combination thereof, or other suitable fluid nail polish products. In one exemplary embodiment, a base product for nail polish includes Butyl Acetate, Ethyl Acetate, Nitrocellulose, Adipic Acid/Neopentyl Glycol/Trimellitic Anhydride Copolymer, Acetyl Tributyl Citrate, Isopropyl Alcohol, Acrylates Copolymer, Stearalkonium Bentonite, N-Butyl Alcohol, Styrene/Acrylates Copolymer, Benzophenone-1, Silica, Alumina, Trimethylpentanediyl Dibenzoate, Titanium Dioxide, a choice of an oil, a combination thereof, or other suitable fluid for nail polish products. In an additional embodiment, a base product for nail polish includes a nitrocellulose-free, water-based formula with adhesive polymers. A base product for the liquid makeup can include oils and emollients, water, silicone (dimethicone, polysiloxane, etc.), oils, colorants, a combination thereof, or other suitable fluid liquid makeup products. In one exemplary embodiment, a base product for the liquid makeup or foundation product can include water, emulsifying ingredients such as dimethicone crosspolymer or polysilicone-11, titanium dioxide, iron oxides, viscosity controlling ingredients such as isohexadecane and cyclomethicone, mineral clays such as silica or kaolin, emollients such as glycerin or squalane, natural preservatives, a combination thereof, or other suitable solid or liquid makeup/foundation products. A base product for skin care products can include serums bases, such as glycerin or water, creams, lotions, cleansers, oils, scrubs, exfoliants, essences, toners, any of the prior mentioned with additional active ingredients, such as acne treatments or SPF agents, can be used or a combination of any thereof, or other suitable skin care product.

Examples

TABLE 1

| | Bottle | Cartridge A | | Cartridge B | | Cartridge C | | Cartridge D | | Cartridge E | |
|---|---|---|---|---|---|---|---|---|---|---|---|
| | Base Formula | Large Reservoir | Precise Reservoir | Larger Container | Smaller Container | Larger Container | Smaller Container | Larger Container | Smaller Container | Larger Container | Smaller Container |
| Starting Amount | 10.00 mL | 20.00 mL | 1.00 mL | 20.00 mL | 1.00 mL | 20.00 mL | 1.00 mL | 20.00 mL | 1.00 mL | 20.00 mL | 1.00 mL |
| After B Dispensed | 10.00 mL | 20.00 mL | 1.00 mL | 19.40 mL | 1.00 mL | 20.00 mL | 1.00 mL | 20.00 mL | 1.00 mL | 20.00 mL | 1.00 mL |
| After C Dispensed | 10.00 mL | 20.00 mL | 1.00 mL | 19.40 mL | 1.00 mL | 20.00 mL | 0.94 mL | 20.00 mL | 1.00 mL | 20.00 mL | 1.00 mL |
| After D Dispensed | 10.00 mL | 20.00 mL | 1.00 mL | 19.40 mL | 1.00 mL | 20.00 mL | 0.94 mL | 20.00 mL | 0.85 mL | 20.00 mL | 1.00 mL |
| After E Dispensed | 10.00 mL | 20.00 mL | 1.00 mL | 19.40 mL | 1.00 mL | 20.00 mL | 0.94 mL | 20.00 mL | 0.85 mL | 19.70 mL | 1.00 mL |
| Amount in Base Product | 10.00 mL | | | 0.60 mL | | 0.06 mL | | 0.15 mL | | 0.30 mL | |

TABLE 2

| | Bottle | Cartridge A | | Cartridge B | | Cartridge C | | Cartridge D | | Cartridge E | |
|---|---|---|---|---|---|---|---|---|---|---|---|
| | Base Formula | Large Reservoir | Precise Reservoir | Larger Container | Smaller Container | Larger Container | Smaller Container | Larger Container | Smaller Container | Larger Container | Smaller Container |
| Starting Amount | 10.00 mL | 20.00 mL | 1.00 mL | 19.40 mL | 1.00 mL | 20.00 mL | 0.94 mL | 20.00 mL | 0.85 mL | 19.70 mL | 1.00 mL |
| After A Dispensed | 10.00 mL | 20.00 mL | 0.85 mL | 19.40 mL | 1.00 mL | 20.00 mL | 0.94 mL | 20.00 mL | 0.85 mL | 19.70 mL | 1.00 mL |
| After C Dispensed | 10.00 mL | 20.00 mL | 0.85 mL | 19.40 mL | 1.00 mL | 20.00 mL | 0.88 mL | 19.22 mL | 0.85 mL | 19.70 mL | 1.00 mL |
| After D Dispensed | 10.00 mL | 20.00 mL | 0.85 mL | 19.40 mL | 1.00 mL | 20.00 mL | 0.88 mL | 19.22 mL | 0.85 mL | 19.70 mL | 1.00 mL |
| Amount in Bottle | 10.00 mL | 0.15 mL | | | | 0.06 mL | | 0.78 mL | | | |

While the invention has been described in detail with specific reference to embodiments thereof, it is understood that variations and modifications thereof is made without departing from the true spirit and scope of the invention.

We claim:

1. A system for the formulation of a custom cosmetic product comprising:
- a computer application deployed on an interface device;
- a housing comprising:
- a management system including a microcontroller having a microprocessor, a memory, and a plurality of sensors, wherein the management system is in electronic communication with the interface device;
- a linear positioning platform;
- a displacing assembly,
- a mixing assembly,
- a capping assembly, wherein the displacing assembly, the mixing assembly and the capping assembly are disposed on the linear positioning platform, and
- and a delivery station configured to receive a bottle,
- a plurality of stationary cartridges, each of the plurality of stationary cartridges being configured to separately contain at least one cosmetic additive required to form a custom cosmetic product; and
- a displacing assembly, wherein the displacing assembly is not in fluid communication with the plurality of stationary cartridges; the displacing assembly configured to physically displace the at least one cosmetic additive from each of the plurality of stationary cartridges, wherein the displacing assembly is comprised of:
- a first positioning sensor;
- a displacement motor positioned at a top of the displacing assembly;
- a displacement lever positioned below the displacement motor and disposed within at least one chamber of at least one cartridge body,
- wherein the displacement lever is operably connected to a displacement track to move in a vertical direction through the displacement motor, wherein the displacement lever is configured to press on a dispensing cylinder of at least one cartridge body; and
- at least one support rod positioned near the displacement track to stabilize the movement of the displacement lever along the displacement track.

2. The system of claim 1 wherein the capping assembly is comprised of:
- a second positioning sensor;
- a capping arm positioned at a top of the capping assembly and configured to move in a vertical direction;
- a capping assembly motor positioned at a bottom of the capping assembly;

a capping assembly track operably connecting the capping arm with the capping assembly motor;

at least one support rod positioned near the capping assembly track;

a cap guide to secure at least one cartridge cap affixed to one of the plurality of cartridges;

a tongue portion, extending from the capping arm, configured to engage with a groove portion of the at least one cartridge cap to remove the at least one cartridge cap from one of the plurality of cartridges.

3. The system of claim 1, wherein the mixing assembly is comprised of:

a mixing motor configured to drive an impeller integrally located within the bottle.

4. The system of claim 1, wherein the linear positioning platform is connected to a linear position assembly track which is further operably connected to the linear positioning assembly motor.

5. The system of claim 4, wherein the linear position assembly track allows horizontal movement of the linear positioning platform through the linear positioning assembly motor.

6. The system of claim 5, wherein the displacing assembly is operably connected to the linear positioning platform through the displacing motor, wherein the capping assembly is operably connected to the linear positioning platform through the capping assembly motor, wherein the displacing assembly is positioned above the mixing assembly.

7. A single batch cosmetic device for mixing a custom cosmetic product comprising:

a management system comprising a microcontroller having a microprocessor, a memory, and a plurality of sensors;

a linear positioning platform configured to transport a displacing assembly, a mixing assembly, and a capping assembly, a first sensor configured to detect the linear position of the displacing assembly;

a second sensor configured to detect the vertical position of the capping assembly; and a housing configured to enclose the management system, the displacing assembly, the mixing assembly, and the capping assembly, wherein the housing is configured to retain a plurality of cartridges, each of the plurality of cartridges containing a cosmetic additive.

8. The single batch cosmetic device of claim 7, wherein the capping assembly comprising:

a capping arm;

a tongue portion extending from the capping arm, configured to engage with a groove portion of at least one cartridge cap to remove the at least one cartridge cap from one of the plurality of cartridge.

9. The single batch cosmetic device of claim 7, wherein each of the plurality of cartridges is comprised of:

a cartridge body enclosing:

an at least one chamber configured to contain a cosmetic additive;

at least one dispensing cylinder configured to displace cosmetic additive from the at least one chamber;

at least one cartridge dispensing spigots in fluid connection with the at least one chamber.

10. The single batch cosmetic device of claim 7, wherein the linear positioning platform is connected to a linear position assembly track, wherein the linear position assembly track is operably connected to the linear positioning assembly motor which enables transport of the displacing assembly, the mixing assembly, and the capping assembly from a first position to a second position.

11. A method of regulating the operation of a cosmetic dispensing system, the cosmetic dispensing system including a linear positioning platform configured to transport: a displacing assembly, a mixing assembly, and a capping assembly;

and a management system including a microcontroller having a microprocessor, a memory, and a plurality of sensors, the method comprising:

receiving, by the management system, an X coordinate position of the linear positioning platform from an at least one first sensor of the plurality of sensors and determining, by the management system, the X coordinate position of the positioning platform;

receiving, by the management system, a Y coordinate position of the capping assembly from an at least one second sensor of the plurality of sensors; determining, by the management system, the Y coordinate position of the capping assembly and regulating by management system, the Y coordinate position of the capping assembly to remove a cartridge cap from at least one cartridge corresponding to the selected cosmetic product;

regulating, by the management system, the position of the displacing assembly to dispense a portion of a cosmetic additive from at least one of a plurality of cartridges;

receiving, by the management system, a Y coordinate position of the capping assembly from an at least one second sensor of the plurality of sensors; determining, by the management system, the Y coordinate position of the capping assembly and regulating by management system, the Y position of the capping assembly to attach the cartridge cap from at least one cartridge corresponding to the selected cosmetic product;

regulating by the management system the transport of the mixing assembly linear positioning platform to the delivery station; and regulating by the management system, the mixing assembly, the mixing of the cosmetic additive in a bottle.

12. The method of claim 11, wherein each of the plurality of cartridges is comprised of: a cartridge body enclosing: a plurality of chambers, the plurality of chambers comprised of first chamber configured to hold a larger volume of a first cosmetic additive and a second chamber configured to hold a small volume of a second cosmetic additive; wherein the step comprises apply force to the first chamber configured to dispense a larger volume of a first cosmetic additive and apply force to the second chamber to dispense a smaller volume of a second cosmetic additive.

* * * * *